3,091,592
HYDROUS OXIDE SOLS
Frederick T. Fitch, Baltimore, Moisés G. Sánchez, Glen Burnie, and Milton C. Vanik, Brookeville, Md., assignors to W. R. Grace & Co., New York, N.Y., a corporation of Connecticut
No Drawing. Filed Aug. 22, 1958, Ser. No. 756,547
8 Claims. (Cl. 252—301.1)

This invention relates to hydrous oxide sols and more particularly to sols wherein the individual particles are substantially homogeneous mixtures of hydrous oxides. In one specific aspect this invention relates to hydrous oxide sols suitable for use as a fuel in single-phase nuclear breeder reactors.

In one type of breeder nuclear reactor, the fuel element is made up of a core of uranyl sulphate solution in a container surrounded by a layer of thorium oxide in aqueous medium. The core provides a continuous source of neutrons which pass into the thoria mass, are captured by the thorium and converted in sequence to thorium 233, protactinium 233 and finally uranium 233, the conversion taking place with release of considerable energy. Uranium 233 is capable of fission with release of tremendous quantities of energy. In this type of reactor, the thorium provides energy and some new fissionable material at the same time.

The breeder "blanket" operates at a temperature about 250–300° C. with a flux of about $10^{13}$ neutrons/cm.$^2$ sec. From the point of view of neutron efficiency it is necessary to have a system free of elements with high neutron-capture cross-sections to insure that the thorium captures a maximum quantity of neutrons. It is also important to have present a moderator comprising an element or elements which can undergo elastic collisions with neutrons while not absorbing neutrons. In this manner, fast neutrons from the core are slowed down to thermal neutrons as they transfer their energy to the system. A suitable reactor combination will include: (1) a source of fast neutrons (core of reactor); (2) thorium dioxide as a breeder fuel; and (3) heavy water as a moderator. Heavy water is an excellent moderator because both oxygen and deuterium exhibit very low neutron-capture cross-sections. In addition, heavy water is an excellent heat transfer material and can be cycled in and out of the reactor. The fast neutrons emitted by the core are slowed down by the heavy water moderator and are then absorbed by the thorium, which starts the above series of reactions whereby large amounts of energy are liberated and the "blanket" heated thereby.

Thoria-deuterium oxide in slurry form has been tried as a reactor "blanket." However, this use has been characterized by several difficulties. In the first place, slurries must be continuously agitated to prevent separation of the solids from the liquid. This alone gives rise to serious problems since it is very difficult to maintain agitation throughout a nuclear reactor system. The slurries are somewhat thixotropic and under quiescent conditions become quite viscous. The thoria particles attrite and, on settling, tend to form a hard cake. In addition, the use of thoria particles of the size normally useable in slurry form erodes the system badly. Also, thoria slurries have poor heat-transfer characteristics. These difficulties have hindered the use of thoria slurries for breeder "blankets."

Another drawback to the present day reactors is that it has been necessary, heretofore, to provide a core of uranyl sulphate, which is extremely corrosive and it has been difficult to find a material suitably resistant to corrosion by the uranyl sulphate and, at the same time, of a type to pass neutrons with a minimum loss. It has not been satisfactory to mix the uranyl sulphate with the thorium oxide slurry constituting the blanket because the entire blanket solution then becomes corrosive. An even greater disadvantage is the necessity of dissipating sufficiently rapidly the heat liberated by fission of the uranium constituting the relatively small core.

It is conceivable that a (non-corrosive) mixture or dispersion of thoria and urania in the right proportions could eliminate the requirement of a core as a neutron source. For obvious reasons, such mixture should preferably be non-corrosive. The presence of electrolytes in the breeder blanket is very undesirable because they are generally corrosive, especially at high temperatures. However, except as described in co-pending application Ser. No. 693,511, filed October 31, 1957, no one has heretofore been able to produce a thoria sol which is stable at the operating temperatures of this system, to say nothing of a mixed thoria-urania sol.

In accordance with the present invention, we have now discovered a thoria-urania sol which is useful as a single-phase fuel which is substantially free of undesirable neutron capturing components, is stable at temperatures employed in nuclear reactors and which contains the urania in intimate contact with the thoria, whereby the use of a core as a source of neutrons is eliminated.

The nuclear fuel of the present invention consists essentially of partially hydrated micelles of thoria and urania of uniform composition corresponding to the ratios desired for operation of a nuclear reactor. The thoria-urania particles are coated or clad with a layer of hydrated silica and the entire sol is stabilized by the presence of a small amount of alkali metal hydroxide. Otherwise, the present sol is substantially free of electrolytes or other contaminants which could capture neutrons.

The hydrous oxide sol of the present invention is prepared by forming a sol of thoria-urania particles and subsequently mixing the sol with a sol of active silica particles which coat the thoria-urania particles and impart thereto a negative electrostatic charge. The resulting particles are then stabilized by the addition of a small amount of sodium hydroxide.

The sol of the present invention contains thoria and urania in the desired ratio, is stable to hydrothermal treatment, is essentially non-corrosive and is substantially free of neutron-capturing undesirable constituents. One very important use of this type of sol is as a combination neutron source and fuel whereby a single phase nuclear reactor system is possible.

In order to obtain a final thoria-urania sol of the necessary hydrothermal stability, low viscosity and susceptibility to cladding, it is desirable that the initial thoria-urania particles be spheroidal or substantially so. In addition, the particles suitable for use in production of the stabilized sols of the present invention should preferably be of uniform size of more than about 25 millimicrons weight median diameter but still exhibiting colloidal properties.

Suitable parent sols can be prepared by gradually removing anions from a dilute solution of thorium and uranium salts while maintaining the system at an elevated temperature. Preferred techniques suitable for anion removal are: (1) electrodialysis using anion permeable membrane, (2) dialysis using an anion permeable membrane, (3) ion exchange using resin in hydroxide form, (4) decomposition of the salt of a volatile acid, (5) electrolysis of mixed uranium and thorium salts, the anions of which are oxidized to a volatile compound or state.

In the present process, we may start with an aqueous solution of thorium and uranium salts of strong monobasic acids, preferably with salts which are sufficiently soluble that a solution containing 5–10% equivalent $ThO_2$ and 0.2–1.0% equivalent $U_3O_8$ can be formed. The polybasic salts are not used because their multi-valent anions adversely affect stability of the sol during formation. The nitrates, chlorides and perchlorates are suitable for the present purpose. For preparation by electrolytic methods, the chlorides would appear to be desirable. However, the product use requires almost complete absence of chlorides and extreme care must be exercised to insure their complete removal. For this reason it is normally preferred to use the nitrates as starting salts. Trace nitrate impurities which might remain in the sol are not as harmful as chlorides would be.

Unclad thoria-urania sols prepared by any of the foregoing techniques are characterized by relatively dense, generally spherical particles having colloidal dimensions and exhibiting no tendency to agglomerate at ambient temperatures. However, on heating, the particles do commence to accrete with the result that they are not sufficiently stable to hydro-thermal treatment to permit their use in nuclear reactors. Cladding provides a method whereby these sols can be rendered satisfactorily stable.

We have discovered that the generally spherical, colloidal, densified thoria-urania particles, prepared as described above, can be clad with a protective layer of silica and then stabilized by maintaining a prescribed pH by use of alkali hydroxides. However, certain hereinafter defined precautions must be taken to insure stability of the final product.

We have also discovered that the parent sol as well as the cladding silica sol should be relatively dilute to insure proper and rapid mixing. For example, it is preferred to use a parent sol at a solids content of about 10%. In like manner, it is preferred to use a cladding silica sol at a concentration of about 1–2% silica.

As explained below, it is desirable that accretion of the silica particles to the thoria-urania particles occur rapidly. Thus it is desirable that the silica particles be in an "active" state, as is characteristic of freshly prepared sols. In addition, the cladding silica sol should be relatively free of large micelles since they are inactive. Silica sols which have been stabilized as by heat treating or aging do not accrete to the thoria-urania particles and are not suitable for the present purposes. Accordingly it can be said that the silica sol should be active or freshly prepared and that it should have been prepared under conditions which yield a micelle size of less than about 5 millimicrons. Useful sols of silica may be prepared by deionizing sodium silicate by passing it through a cation exchange resin. Ion exchange is the preferred method since it yields a sol substantially free of electrolytes. This method is described fully in U.S. Patent No. 2,244,325. It is preferable that both the thoria-urania and silica sols be substantially free of electrolytes at the time they are brought together. A silica sol prepared by ion exchange contains virtually no sodium (about 0.002%) and is very reactive. Sols of about 2% silica are preferred at this stage.

The thoria-urania particles in the parent sol carry a positive charge, whereas silica particles carry a negative charge. This can be demonstrated by electrophoresis measurements made by the method described in "Physical Methods of Organic Chemistry," part II, 2nd edition, by A. Weissberger, page 1685. The apparatus comprises a Tiselius cell and a Schlieren optical system.

Mixing thoria-urania and silica sols in amounts sufficient only to neutralize the charges of the respective particles may result in precipitation at the isoelectric point. We have discovered that this precipitation does not occur if the mixing is carried out under such conditions that the charge on the thoria-urania particles is changed quickly from positive to negative and the mixture is not allowed to stand for any appreciable time at the isoelectric point. Thus, it is necessary that the silica sol be mixed with the parent sol rapidly and with thorough mixing so that the particles or micelles of thoria-urania and silica are brought to the negative side substantially instantaneously. In this way, precipitation can be avoided.

In order to insure complete and rapid mixing of the silica and thoria-urania particles, the sols should be relatively dilute when mixed. Once the thoria-urania has been coated with silica particles and the coated aggregates exhibit a negative charge, the danger of precipitation is not so great. This mixed sol exhibits some of the properties of silica sols and, since both sols were acid, the mixed sol is also acid. In general, the mixed sol is not stable for long periods at acid pH and may be precipitated by the addition of electrolytes or by heating to concentrate. We have found that the mixed sol can be stabilized by the addition of sufficient alkali metal hydroxide to raise the pH of the solution to a value of 7.0–11.0, the preferred pH being about 7.5–9.0. This should be done soon after mixing. At about pH 11, the silica begins to be redissolved. Therefore, it is desirable to add just enough alkali to insure stability of the final sol but not enough to dissolve the silica.

The amount of silica used in cladding the thoria-urania particles must be sufficient to convert the charge on the particles from positive to negative. The weight ratio of thoria-urania to silica cannot be stated with mathematical exactness since the amount of silica required to coat a particle is dependent on the amount of surface and not on the weight of the particle. Obviously if the particles of thoria-urania are large, the weight ratio of silica to thoria-urania may be lower than for smaller particles. In general, the weight ratio will be in the range of about 1:1 to 10:1 and preferably between 2:1 to 3:1.

Since neutron capture is a nuclear process depending on atomic concentration, the molar ratio of thoria-urania to silica should be as high as possble. However, even at weight ratios as low as 1:1 (molar ratio of 0.227 to 1), the presence of silicon does not reduce the efficiency too much because its thermal neutron capture cross-section (measure of neutron capturing ability) is 0.13 barn as compared with 7.0 barns for thorium, and the reported 520 barns for uranium. Thus at a thoria-to-urania composition of 95 to 5 and a thoria-urania to silica weight ratio of 1:1, the silicon will capture about 1% of the neutrons, the thorium will capture about 20% and the uranium will capture about 79%. It can be seen that in such a mixture a major portion of the neutrons will be consumed in the nuclear reactions of uranium. Initially, the uranium will be exhausted at a different rate than it is formed and the system will approach a steady state in which the uranium is consumed as it is formed. The fission products of uranium will also capture neutrons at varying rates characteristic for each. To maintain a low concentraton of these undesirable by-products, a stream of the thoria-urania can be continuously withdrawn and replaced with fresh sol. Thus, it is possible to maintain a constant rate of energy release. The composition of the fuel can be varied at will and on short notice and control of the system is greatly facilitated. The operation of a nuclear reactor is not a part of this invention and the foregoing is presented solely by way of illustration. With this in mind, the advantages of a single-phase homogeneous reactor are readily obvious. The thoria-urania composition of the present invention make this type of reactor feasible for the first time.

The anionic content of the clad sol is usually in the range of 0.10–1.0 weight percent. When the anion content of the mixed sol is undesirably high, further purification is required. This can best be done by heating the alkaline sol under non-evaporative conditions i.e. under total reflux or in an autoclave, to release anions from within the micelles, cooling this solution, and contacting it with a deionizer to remove the electrolytes. If the alkali metal ions are removed, the pH should again be adjusted to about 7.0–11.0, as stated above. Except for stabilizing alkali metal cations, the resulting solution is substantially electrolyte free.

During heating of the parent sol, as described above, the silica particles become more closely associated with the parent micelles. Autoclaving at about 150° C. or higher is desirable to insure complete interaction of the silica and thoria-urania particles. No evidence of free silica particles is seen in electron micrographs of autoclaved sols, but the micelles appear as large, dense cores (thoria-urania) having a less dense shell (silica). The sol at this stage is stable indefinitely at temperatures up to 300° C. These sols are well suited for the nuclear reactor use discussed above.

Sols prepared as described can be concentrated by evaporation to a solids content of up to 50% or higher. These sols have generally been concentrated to a 1.5 density, which, with the normally employed ratios of components, gives a thoria-urania content of about 25–30% and a silica content below about 15%, depending on the thoria-urania to silica ratio. During the concentrating step, it is preferred to add fresh sol continuously to avoid deposition of solid material on the sides of the vessel. The finished sol may be diluted to any lower solids content by the addition of deionized water or water of sufficiently low ionic content.

Since sols of this type tend to coagulate or precipitate on the addition of electrolytes, care must be taken that the electrolyte content be maintained at a minimum. A convenient method of measuring concentration of the undesired ionic materials is conductivity. For the sols of the present invention, specific conductivity will usually range between $10^{-4}$ and $10^{-2}$ mhos. The stability of any given sol is improved by a reduction in the ionic content. Therefore, conductivities in the lower part of this range are preferred for maximum hydrothermal stability.

Our preferred hydrothermally stable sols have a specific conductivity less than that of a pure alkali metal hydroxide solution at the same alkali concentration. Conductivity is measured at 25° C. and one kilocycle using a standard conductivity bridge with a cell inserted in one arm. The cell constant is determined using KCl solutions of 0.01 and 0.02 normality (the conductivity of which is ascertained from conductivity tables) and using the equation:

$$K = L_{KCl} R$$

where $K =$ is the cell constant in cm.$^{-1}$
$R =$ bridge resistance in ohms
$L =$ conductivity in mho cm.$^{-1}$ of the standard KCl solution The conductivity L of the sol in question is determined by measuring its resistance in the same cell and using the equation:

$$L_{sol} = \frac{K}{R}$$

where $K =$ cell constant
$R =$ resistance in ohms

The effectiveness of a thoria-urania sol for neutron capture in a reactor increases with an increase in the concentration of thoria-urania. It is desirable that the micelles have a relatively high density while maintaining desired stability in order to allow highest concentrations. Densification of the particles is obtained during the formation of the parent sol and, to some extent, during subsequent treatment. Maximum concentration of thoria-urania which may be obtained in the sol is primarily dependent on its pH, particles size distribution, particle density, and ratio of thoria-urania to silica. At a given pH, weight percent concentration and ratio of thoria-urania to silica, the sol of the largest particle size will have the lowest viscosity. Since thoria and urania are more dense than silica, the higher the ratio, the higher will be the weight percent solid matter at the same viscosity. In general, sols of good stability have low viscosities. To facilitate use of the stable sols of the present invention in a nuclear reactor system, a low viscosity is desirable, a relative viscosity below about 3 at 45% solids being preferred.

The thorium and uranium content of our sols was determined by fluorescent X-ray spectroscopy using the techniques described in ASTM Special technical Publication No. 157.

Electron micrographs were made by conventional techniques.

In the present disclosure, we have referred to the use of alkali metal hydroxide and specifically sodium hydroxide although other bases may be used. However, the selected base should be composed of low thermal neutron cross-section elements and be stable under reactor conditions.

In referring to our sols as dispersions in water, we mean to include heavy water as well as natural water.

The present invention will be further explained by the following illustrative, but non-limiting examples.

*Example 1*

A starting solution was prepared by dissolving 431 g. of Th(NO$_3$)$_4$.4H$_2$ and 18.5 g. of UO$_2$(NO$_3$)$_2$.2H$_2$O in sufficient deionized water to yield a single solution weighing 4100 g. Of this total amount, 3750 g. was taken for the present run. The equipment consisted of a tank of sufficient size to act as reservoir and having means for maintaining the solution near its boiling point. An outlet line leaving the reservoir passed through a water-cooled heat exchanger into a sigma motor pump which pumped the solution through the cathode compartment of an electrodialysis cell and thence through a preheater into the reservoir.

The cell was of generally flat circular shape made up of opposing concave shells with an anion exchange membrane (Amberplex A–1) positioned between them and forming cathode and anode compartments. The electrodes were discs of 45 mesh platinum gauge positioned on each side of the membrane. Deionized flushing water was continuously passed through the anode compartment.

The temperature in the reservoir was maintained at about 98–99° C. The solution was withdrawn at a rate of about 100–120 cc./min. through the cooler, where its temperature was reduced to 25–30° C., and then through the pump into the cathode compartment of the cell, thence into the preheater, where its temperature was raised to 70–90° C. at which temperature it was returned to the reservoir.

Starting with a current of 10 amperes, the electrodialysis was completed in 20.5 hours. The resulting light orange thoria-urania sol weighed 3369 g., had a specific gravity of 1.04, a pH of 4.0 and a solids content of 4.65%. An electron micrograph of some of this product showed that the thoria-urania was present as well-formed spherical particles ranging downward from about 60 millimicrons and having an average diameter of about 40 millimicrons.

To the thoria-urania sol was added 3600 g. of fresh 2% silica sol prepared by passing a sodium silicate solution through an acid-form Dowex 50 cation resin column and the two sols were rapidly mixed. Sufficient 1 N NaOH (0.306 equivalent) solution was added to raise the pH to about 9 and the sol was refluxed overnight. The refluxed sol was deionized by passing it through a mixed resin and the pH was then adjusted with additional 1 N NaOH (0.05 equivalent) to a value of about 8.35.

An electron micrograph of the material at this stage showed an appreciable amount of fine sized silica coating the thoria-urania particles. The sol was concentrated to 18.6% solids and was then autoclaved overnight at 150° C. At this stage, an electron micrograph indicated a complete reaction of the silica to form a uniform, well-defined surface layer about 10–15 millimicrons thick. A portion of this sol was concentrated by evaporation at constant volume to about 41% solids. The properties of the 18.8% and the 41% sols are shown below.

|  | A, 18.8% solids | B, 41% solids |
| --- | --- | --- |
| Percent $ThO_2$ (X-ray) | 12.8 | 25.8 |
| Percent $U_3O_8$ (X-ray) | 0.53 | 1.35 |
| Density | 1.17 | 1.50 |
| pH | 9.05 | 7.85 |
| Spec. conductivity, mho/cm | 0.0004 | 0.0007 |
| Rel. viscosity (25° C.) | 1.07 | 1.75 |

*Example II*

To test the stability of the sols prepared in the foregoing example, portions of each were sealed in Pyrex tubes and were heated for over 200 hours at 250° C. Visual examination revealed that the sols came through this heating unchanged.

Portions of each of the above sols were heated at 250° C. for over 200 hours in small stainless steel bombs. Examination of the product revealed no tendency to coagulate or precipitate although the original orange color changed to gray. This may be due to a reduction of the uranium from hexavalent to quadrivalent state.

A portion of sol "B" above was heated 175 hours at 275° C. in a stainless steel bomb. The sol proved to be stable under these conditions.

In view of the extreme sensitivity of the thoria-urania sol of the present invention to electrolytes, it is necessary to control scrupulously the electrolyte content, desirably maintaining a specific conductivity level of the order of $10^{-3}$ mhos or less.

In addition to the electrodialysis method described above for preparing the thoria-urania, it is also possible to do this by regular dialysis or ion exchange or even by electrolysis. The method here employed is preferred.

By the term relative viscosity, we mean the kinematic viscosity relative to water at 25° C. as determined by ASTM Method D445-53T.

By urania, we mean all hydrous oxide forms of uranium expressed as $U_3O_8$; by thoria, we mean the hydrous oxide forms of thorium expressed as $ThO_2$; and by silica, we mean the hydrous oxide forms of silicon expressed as $SiO_2$.

We claim:

1. A hydrothermally stable sol comprising homogeneous particles of colloidal size consisting of urania and thoria, the urania content being up to 10 weight percent based on the thoria, having distended on their surfaces a layer of silica, the thoria-urania to silica weight ratio being in the range of from 10:1 to 1:1, said particles being dispersed in aqueous medium and substantially free of contaminating electrolytes.

2. A hydrothermally stable sol comprising homogeneous particles of colloidal size consisting of urania and thoria, the urania content being up to 10 weight percent based on the thoria, having distended on their surfaces a layer of silica, the thoria-urania to silica weight ratio being in the range of from 10:1 to 1:1, said particles being dispersed in alkaline aqueous medium and substantially free of contaminating electrolytes.

3. A stable hydrous oxide sol comprising an aqueous alkaline dispersion of homogeneous particles in the colloidal size range consisting of urania and thoria intimately associated and having a coating of hydrated silica sufficient to induce a negative charge on said particles, the urania content being up to 10 weight percent based on the thoria and the thoria-urania to silica weight ratio being in the range of from 10:1 to 1:1.

4. A stable hydrous oxide sol comprising an alkaline dispersion of up to 50% of colloidal particles consisting essentially of thoria and urania dispersed, coated with a layer of hydrated silica in sufficient amount to induce a negative charge on said particles, the thoria-urania to silica weight ratio being in the range of 10:1 to 1:1, said dispersion containing sufficient sodium hydroxide to maintain a pH of about 7.0–10.0 and being otherwise electrolyte-free.

5. A hydrothermally stable concentrated hydrous oxide sol comprising up to 50% of spheroidal particles of colloidal dimensions and consisting essentially of a major portion of thoria having up to 10%, based on thoria, of urania distributed throughout the thoria and having a coating of inactivated silica in an amount sufficient to impart a negative charge to said particles, the thoria-urania to silica weight ratio being in the range of 10:1 to 1:1, said sol containing sufficient NaOH to maintain a pH of about 7.0–9.5 but being otherwise substantially electrolyte-free.

6. The method of preparing a hydrothermally stable aqueous sol of mixed thoria-urania particles comprising the steps of dialyzing a hot mixed solution of thorium and uranium nitrates to remove anions and leave behind homogeneous colloidal particles of thoria and urania, rapidly mixing with the dialyzed solution an aqueous sol of active silica, adding sufficient sodium hydroxide to adjust the pH to a value between 7.0 and 10.0 and concomitantly induce a negative charge on said thoria-urania particles, heating the sol mixture under non-evaporative conditions to deactivate the silica therein, deionizing the resulting solution and adjusting the pH of the sol to about 7.0–10.0 with sodium hydroxide and concentrating the resulting sol by evaporation at constant volume.

7. As a composition of matter, built-up generally spherical particles in the colloidal size range consisting essentially of thoria having up to 10 weight percent of urania uniformly dispersed therethrough and having a coating of silica, the thoria-urania to silica weight ratio being in the range of from 10:1 to 1:1, said particles being dispersible to form a hydrothermally stable thoria-urania sol.

8. A thoria-urania sol stable at temperatures up to 250° C. consisting essentially of an aqueous dispersion of homogeneous particles of thoria and urania in a weight ratio of thoria to urania of 10:1 to 99:1, a particle size in the colloidal size range and having a coating of hydrated silica, said dispersion containing sufficient sodium hydroxide to maintain the pH at 7.0–10.0 but being otherwise substantially electrolyte-free.

References Cited in the file of this patent

UNITED STATES PATENTS

| 2,877,091 | Hiskey | Mar. 10, 1959 |
| 2,885,366 | Iler | May 5, 1959 |

OTHER REFERENCES

AEC Document ORNL–1812, Jan. 27, 1955.